United States Patent [19]
Shigeura

[11] Patent Number: 5,222,406
[45] Date of Patent: Jun. 29, 1993

[54] GEAR DRIVE DEVICE FOR RAILWAY MOTOR CAR

[75] Inventor: Junichi Shigeura, Amagasaki, Japan

[73] Assignee: Mitsubishi Denki Kabushiki Kaisha, Tokyo, Japan

[21] Appl. No.: 858,864

[22] Filed: Mar. 27, 1992

[30] Foreign Application Priority Data

Mar. 29, 1991 [JP] Japan .................. 3-093016

[51] Int. Cl.$^5$ .............. F16H 57/00; F16H 1/12
[52] U.S. Cl. ................. 74/410; 74/412 R; 74/421 A
[58] Field of Search ......... 74/410, 412, 421 R, 74/421 A

[56] References Cited

U.S. PATENT DOCUMENTS

| | | | |
|---|---|---|---|
| 3,178,966 | 4/1965 | Wildhaber | 74/410 |
| 3,262,331 | 7/1966 | Breuer | 74/412 |
| 3,478,834 | 11/1969 | Hetmann | 74/412 |
| 4,022,074 | 5/1977 | Mabuchi et al. | 74/421 A |
| 4,940,002 | 7/1990 | Bien | 105/136 |

FOREIGN PATENT DOCUMENTS 566042 12/1932 Fed. Rep. of Germany.
334505 1/1959 Switzerland.

OTHER PUBLICATIONS

ASEA Journal, vol. 60, No. 3-4, pp. 22-25, 1987, I. Johansson, et al., "DEVELOPMENT OF GEARS FOR NARROW-GAUGE RAILWAY VEHICLES".

Gear Handbook NDC 531.6, Nikkan Kogyo Shinbunsha, Nov. 30, 1962, pp. 411-428.

Primary Examiner—Rodney H. Bonck
Assistant Examiner—Ryan W. Massey
Attorney, Agent, or Firm—Oblon, Spivak, McClelland, Maier & Neustadt

[57] ABSTRACT

In a gear drive device of a railway motor car having a larger gear fixed on an axle and a smaller gear fixed on a rotation shaft of a traction motor, tooth trace of the smaller gear or that of the larger gear is twisted in a manner that the teeth of the smaller and larger gears are engaged in parallel with each other when the axle is deflected due to the load of the railway motor car.

5 Claims, 11 Drawing Sheets

GEAR DRIVE DEVICE FOR RAILWAY MOTOR CAR

BACKGROUND OF THE INVENTION

1. Field of the Invention

The present invention relates to an improvement of a gear drive device for transmitting a driving force of a traction motor to an axle in a track of a railway motor car, which consists of a larger gear fixed on the axle and a smaller gear fixed on the traction motor.

2. Description of the Prior Art

As a railway motor car having a motive power, there are an electric locomotive, an electric car, a Diesel electric locomotive which has a generator driven by a Diesel engine and traction electric motors driven by electric power generated by the generator, and so on. A conventional gear drive device applied to an electric locomotive is described below. FIG. 6 is a side view showing a constitution of an electric locomotive, schematically. In FIG. 6, the electric locomotive 10 comprises a body 11, bogies 12, a pantograph 15 for collecting an electric power from an overhead wire 17. The bogie 12 has plural wheels 13 which run on a track 16. The body 11 is mounted on the bogies 12.

FIG. 7 is a plan view showing a constitution of the bogie 12. In FIG. 7, a pair of wheels 13 are fixed on an axle 19. The axle 19 is borne by a pair of bearings 20 at both ends thereof. The bearings 20 are movably held on a frame 18 by way of springs (not shown). Thereby, the frame 18 is supported by the wheels 13. A smaller gear 23 is fixed on an end of a rotation shaft 22 of a traction motor 21. A larger gear 24 is fixed on the axle 19 and engaged with the smaller gear 23. The traction motor 21 is hung on the axle 19 by a pair of bearings 25 and a nose 26 of the traction motor 21 is suspended on the frame 18, elastically.

In the electric locomotive 10, the traction motor 21 is high-powered and it is relatively large. As shown in FIG. 7, the high-powered traction motor 21 must be contained in a small space between the pair of wheels 13. Therefore, it is requested to make a constitution of a gear drive device simple and occupied space of the gear drive device small. Accordingly, the above-mentioned constitution, wherein the traction motor 21 is directly hung on the axle 19 and a driving force of the traction motor 21 is transmitted to the axle 19 by a gear train of the smaller gear 23 and larger gear 24 thereby occupying the relatively small space, is adopted as a drive device of the electric locomotive 10. Such a drive device is called "Nose suspended/axle hung drive device".

Weight of the locomotive 10, which is mainly the sum of the weights of the body 11 and the frame 18 of the bogie 12, acts on the bearings 20, distribusively. Reaction forces act on parts of the axle 19 where the wheels 13 are fixed. Therefore, the axle 19 is deflected. The deflection of the axle by the weight of the locomotive 10 is shown in FIG. 8. As shown in FIG. 8, loads "W" due to the weight of the body 11 and the frame 18 act on points 20a which are pressure cone apexes of the bearings 20 on the frame 18. And the reaction forces act on points 13a which are the fixing point of the wheels 13 on the axle 19. As a result, the axle 19 is deflected as shown by deflection curve 19b from a virtual line 19a. The virtual line 19a is a center axis of the axle 19 when no load is applied thereto. The larger gear 24 which is fixed on the axle 19 inclines vertical to the deflection curve 19b cased by the deflection of the axle 19 and the angle of deflection of the larger gear 24 between the center axis 24a of the larger gear 24 and the virtual line 19a is designated by "α".

Next, the smaller gear 23 which is fixed on the rotation shaft 22 of the traction motor 21 is considered. FIG. 9(A) is a cross-sectional side view showing a constitution of the traction motor 21. In FIG. 9(A), the traction motor 21 comprises a stator 27, a rotor 28 which is fixed on the rotation shaft 22 and bearings 29 for rotatively bearing the rotation shaft 22 on a housing 30. As shown in FIG. 7, a driving force of the traction motor 21 is transmitted from the smaller gear 23 to the larger gear 24. Hereupon, direction of a reaction force from the larger gear 24 to the smaller gear 23 changes responding to the rotation direction of the traction motor 21.

When the motor is seen in a direction shown by arrow X in FIG. 9(A), when the rotation shaft 22 of the traction motor 21 is rotated in clockwise direction, the smaller gear 23 receives a reaction force in a direction shown by arrow $P_1$ in FIG. 9(B) from the larger gear 24. Therefore, the rotation shaft 22 of the traction motor 21 is distorted as shown by deflection curve 22b in FIG. 9(B). The center axis 23a of the smaller gear 23 is inclined against a virtual line 22a and the angle of deflection is designated by "$\beta_1$".

On the other hand, when the rotation shaft 22 of the traction motor 21 is rotated in counterclockwise direction, the smaller gear 23 receives the reaction force in opposite direction shown by arrow $P_2$ in FIG. 9(C) from the larger gear 24. The rotation shaft 22 of the traction motor 21 is deflected as shown by deflection curve 22b in FIG. 9(C) wherein the angle of deflection of the shaft 22 is designated by "$\beta_2$".

FIG. 10(A) is cross-sectional view showing a relative inclination between tooth trace of the smaller gear 23 shown in FIG. 9(B) and that of the larger gear 24 shown in FIG. 8, in case that the traction motor 21 rotates clockwise seen from the direction shown by arrow X in FIG. 9(A). In FIG. 10(A), numeral 23b designates a cross-section of a tooth of the smaller gear 23, which is engaged with the larger gear 24, on a pitch circle. Numeral 24b designates a cross-section of a tooth of the larger gear 24, which is engaged with the smaller gear 23, on a pitch circle. In FIG. 10(A), an angle designated by "α" is the same as the angle of deflection of the larger gear 24 shown in FIG. 8, an angle designated by "$\alpha_1$" is the same as the angle of deflection of the smaller gear 23 shown in FIG. 9(B), and an angle designated by "$\theta_1$" is an angle of relative inclination between the tooth trace of the tooth 23b of the smaller gear 23 and the tooth trace of the tooth 24b of the larger gears 24, which are engaged with each other.

FIG. 10(B) is a cross-sectional view showing a relative inclination between tooth trace of the smaller gear 23 shown in FIG. 9(C) and that of the larger gear 24 shown in FIG. 8, in case that the traction motor 21 rotates in counterclockwise direction seen from the direction shown by arrow X in FIG. 9(A). In FIG. 10(B), the teeth 23b and 24b and an angle designated by "α" are similar to those in FIG. 10(A). An angle designated by "$\beta_2$" is the same as the angle of deflection of the smaller gear 23 in FIG. 9(C) and an angle designated by "$\theta_2$" is an angle of relative inclination between the tooth trace of the tooth 23b of the smaller gear 23 and the tooth trace of the tooth 24b of the larger gear 24, which are engaged with each other.

As shown in FIGS. 10(A) and 10(B), different angles of deflection occur in the smaller gear 23 and the larger gear 24, which are engaged with each other for transmitting a rotation force of the traction motor 21, corresponding to the rigidities of the rotation shaft 22 and the axle 19 whereon the gears 23 and 24 are fixed, respectively. Therefore, if the smaller and larger gears 23 and 24 are general spur gears, the teeth 23b and 24b contact at an end point designated by "A" in FIG. 10(A) or an end point designated by "B" in FIG. 10(B). Such a phenomenon is very disadvantageous in view of the durability of the teeth of the gears 23 and 24.

On the other hand, as shown in FIG. 11 which is a cross-sectional view showing another conventional tooth traces, teeth of one of the smaller gear 23 and the larger gear 24 (generally the smaller gear 23) have roundish section $R_{c11}$ on the pitch circle, for preventing the above-mentioned disadvantage. This rounding of section is called "crowning", whereby the contacting point of the teeth 23c and 24b shifts to a point designated by "C" which is inside in comparison with the point designated by "A" in FIG. 10(A) or "B" in FIG. 10(B).

In the conventional gear drive device, axes of the gears, which are engaged with each other, are presupposed to be parallel under such a condition that no load is applied to them. As shown in FIG. 12, which is a cross-sectional view showing the shape of the tooth 23c of the smaller gear 23, the crowning is formed on both surfaces of the tooth 23c of the smaller gear 23. The tooth 23c whereto the crowning is provided has to satisfy the severest condition, for example, shown in FIG. 10(B). In the severest condition shown in FIG. 10(B), the relative inclination angle $\theta_2$ of the gears 23 and 24 is larger than that of $\theta_1$ shown in FIG. 10(A). Furthermore, for making the smaller gear 23 simple, teeth of the smaller gear 23 are generally formed symmetrical with respect to radii on a sectional plane vertical to the rotation axis. Therefore, radius of curvature $R_{c11}$ of the crowning is unified to the smaller one.

Generally, a reaction force at a contacting point, when barrel shaped bodies contact each other as shown in FIG. 13, is approximated by a following equation (1).

$$\sigma \approx \sqrt[3]{P \cdot K \left[ \left( \frac{1}{R_1} + \frac{1}{R_2} \right) + \left( \frac{1}{R_{c1}} + \frac{1}{R_{c2}} \right) \right]^2} \quad (1)$$

Hereupon, $\sigma$: tangential contact stress at a point "C" in FIG. 13,

P: pressing force acting between the barrel shaped bodies 23d and 24d in FIG. 13, K: a constant including Young's moduli and Poisson's ratios of materials of the barrel shaped bodies 23d and 24d in FIG. 13, $R_1$: a radius of the barrel shaped body 23d in a section including the point "C" and vertical to the axis thereof in FIG. 13, $R_2$: a radius of the barrel shaped body 24d in a section including the point "C" and vertical to the axis thereof in FIG. 13, $R_{c1}$: a radius of the barrel shaped body 23d in a section including the point "C" and parallel to the axis thereof in FIG. 13, $R_{c2}$: a radius of the barrel shaped body 24d in a section including the point "C" and parallel to the axis thereof in FIG. 13.

In FIG. 13 and the above-mentioned equation (1), $R_1$ corresponds to a radius of an involute tooth of the smaller gear 23; $R_2$ corresponds to a radius of an involute tooth of the larger gear 24; $R_{c1}$ corresponds to the radius of the crowning $R_{c11}$ of a tooth surface of the smaller gear 23; $R_{c2}$ corresponds to a radius of the radius of the crowning of a tooth surface of the larger gear 24 (which is actually infinity since the crowning is not put in practice); the pressure "P" corresponds to an operating force of the gears 23 and 24, and therefore the contact stress "$\sigma$" corresponds to a contact stress on teeth surfaces of the gears 23 and 24. From the equation (1), it is known that the larger the radiuses $R_1$, $R_2$, $R_{c1}$, $R_{c2}$ are made, the smaller the contact stress "$\sigma$" can be made.

As shown in FIGS. 11 and 12, in the conventional gear drive device, the radius $R_{c11}$ of the crowning must be decided so as to respond to the larger relative inclination angle $\theta_2$. Therefore, the radius $R_{c11}$ of the crowning becomes smaller. As a result, the contact pressure of the teeth of the gears becomes larger.

SUMMARY OF THE INVENTION

Purpose of the present invention is to solve the above-mentioned problem of the conventional gear drive device and to provide an improved gear drive device for railway motor car wherein the contact stress appearing on a contacting surface of the engaged tooth of the gear is reduced and the transmissibility of the rotation force of the motor is increased.

A gear drive device for railway motor car in accordance with the present invention comprises:

a larger gear fixed on an axle which is rotatively held on a frame of a bogie;

a traction motor suspended on the axle and the frame;

A smaller gear which is fixed on a rotation shaft of the traction motor and engaging with the larger gear; wherein tooth trace of either one of the smaller gear and the larger gear is twisted for the engagement with tooth trace of the other in a manner that teeth of both of the larger gear and the smaller gear engaging thereto corresponding to an inclination of a center axis of the larger gear due to deflection of the axle by receiving a load of the railway motor car; and tooth traces of either one of the smaller gear and the larger gear has crowning.

In the present invention, tooth trace of the smaller gear is twisted with respect to that of the larger gear corresponding to the tooth trace of the larger gear and vice versa. Thereby, a radius of the crowing provided on tooth trace of one of the smaller gear or the larger gear is made to be large and an area of contacting of the tooth faces of the smaller gear and the larger gear is also made to be large. As a result, the contact pressure appeared on the teeth of the smaller gear and the larger gear is reduced.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
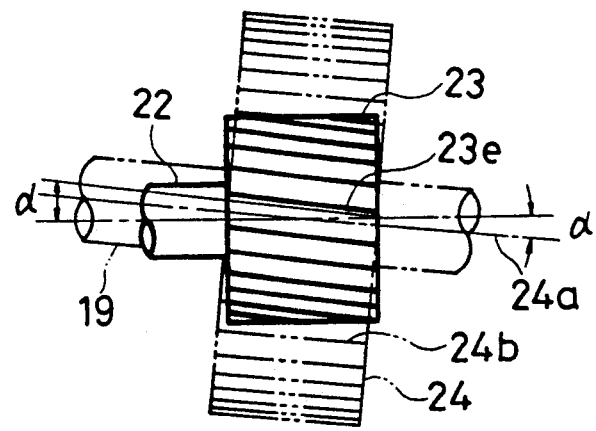
FIG. 1 is a front view showing a preferred embodiment of an engagement of a smaller and a larger gears of a gear drive device for railway motor car in accordance with the present invention.
Figure 2:
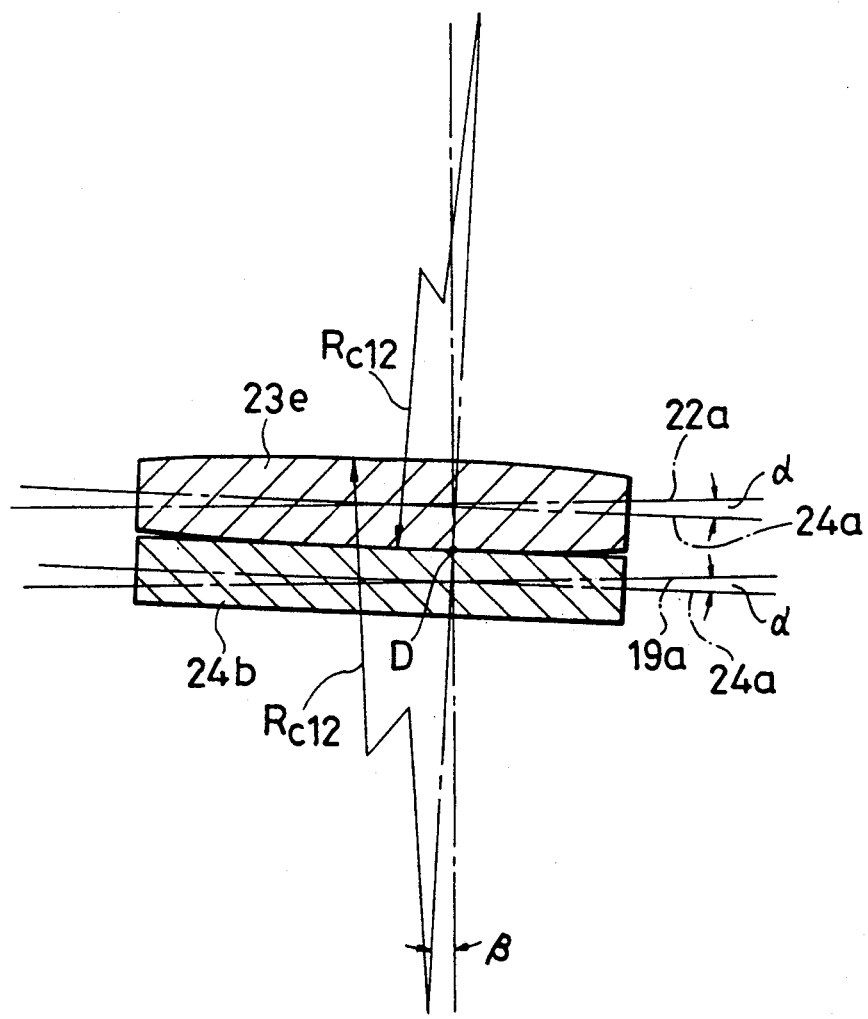
FIG. 2 is a cross-sectional view of the teeth on an involute circle for showing crowning provided on a tooth 23e of a smaller gear 23 coupled with a tooth 24b of a larger gear 24.
Figure 7:
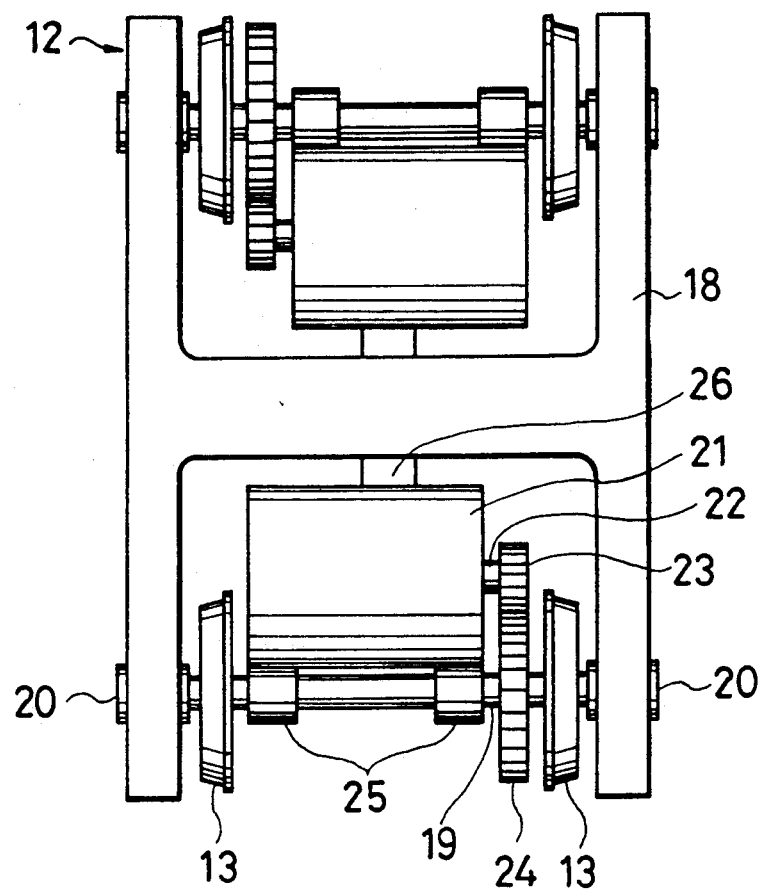
FIG. 7 is the plan view showing the constitution of the bogie of the electric locomotive shown in FIG. 6.
Figure 8:
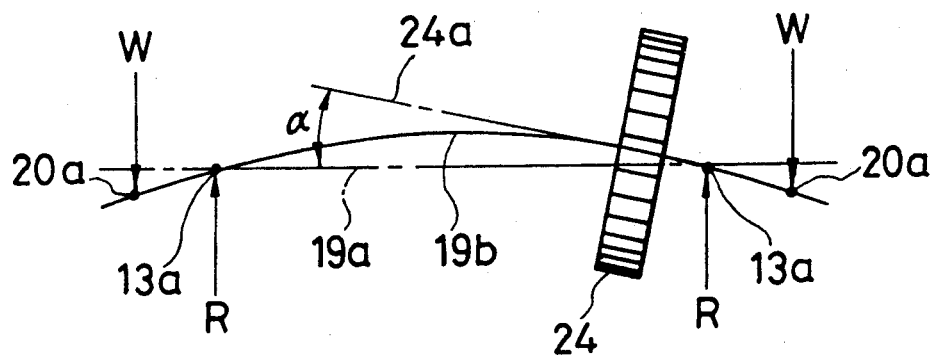
FIG. 8 is the drawing showing the deflection of the axle due to the loads of the body and the frame of the bogie.
Figure 9A:
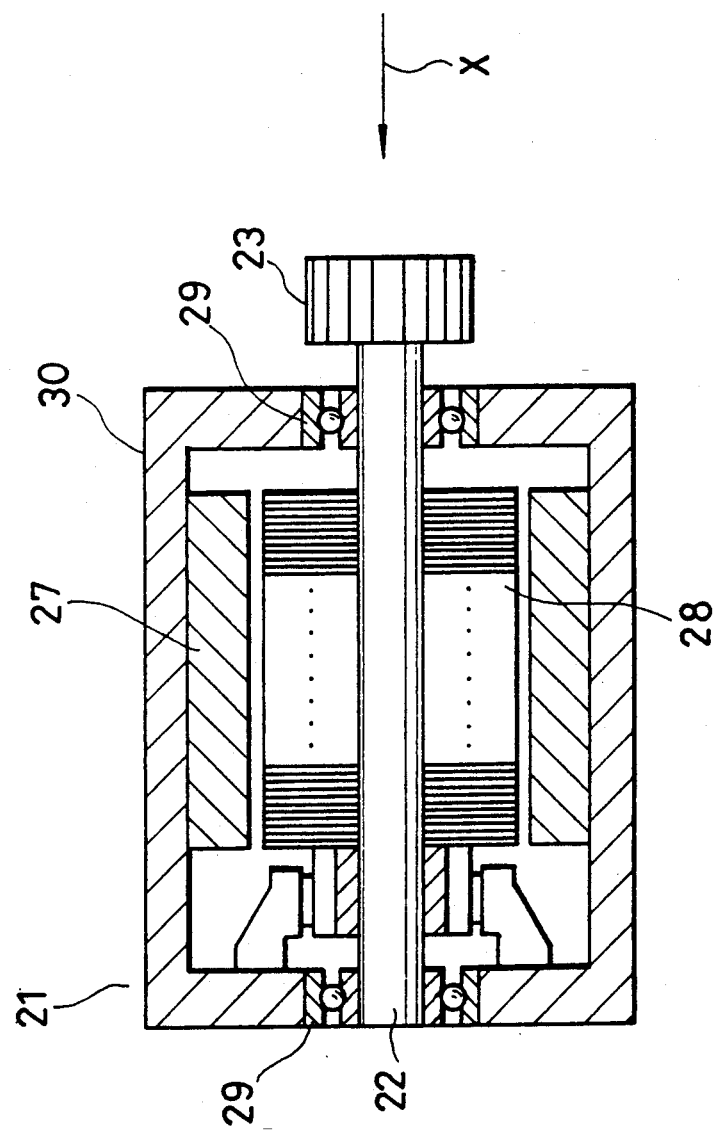
FIG. 9(A) is the cross-sectional side view showing the constitution of the traction motor.
Figure 9B:
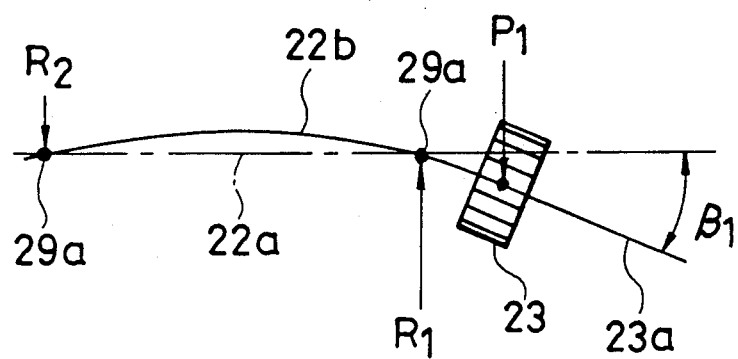
FIG. 9(B) is the drawing showing the deflection of the rotation shaft 22 of the traction motor when the rotor 28 of the motor in FIG. 9(A) is rotated in clockwise direction seen in the direction shown by arrow X.
Figure 9C:
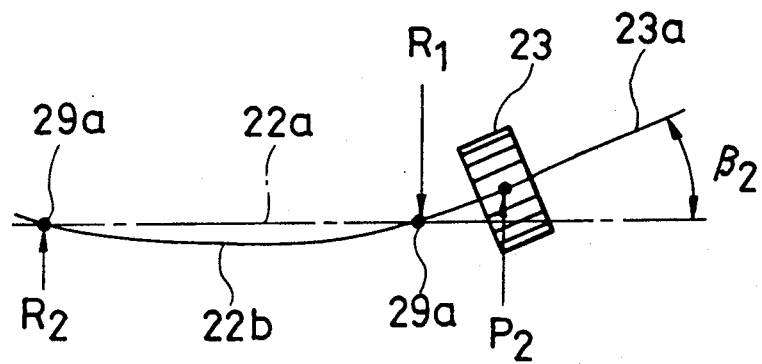
FIG. 9(C) is the drawing showing the deflection of the rotation shaft 22 of the traction motor when the rotor 28 of the motor in FIG. 9(A) is rotated in counterclockwise direction seen in the direction shown by arrow X.

A preferred embodiment of a gear drive device for railway motor car in accordance with the present invention is described referring to FIGS. 1 to 5. FIG. 1 is a front view showing an engagement of a smaller and a larger gears of a gear drive device for railway motor car in a first embodiment, wherein teeth of the larger gear 24 facing to the smaller gear 23 are shown by virtual lines (two-dot chain lines). In FIG. 1, tooth traces of the teeth 24b of the larger gear 24 shown by two-dot chain line are cut in parallel to the axis of the axle 19 that is not deflected at all, as same as the conventional ones. FIG. 1 shows the case that the axle 19 with the larger gear 24 is assembled in the frame 18 of the bogie 12 shown in FIG. 7. The center axis 24a of the larger gear 24 is inclined with an angle designated by "α" which is the same as "α" in FIG. 8 corresponding to the deflection of the axle 19 due to the load applied to the axle 19. Tooth traces of the teeth 23e of the smaller gear 23 is twisted responding to the inclination angle "α" so as to be parallel to the tooth traces of the teeth 24b of the larger gear 24. As a result, a radius $R_{c12}$ of the crowning shown in FIG. 2 can be made larger than that of the radius $R_{11}$ of the conventional crowning shown in FIG. 12. In FIG. 2, "D" designates a point of contacting of the teeth 23e and 24b.

Figure 3:
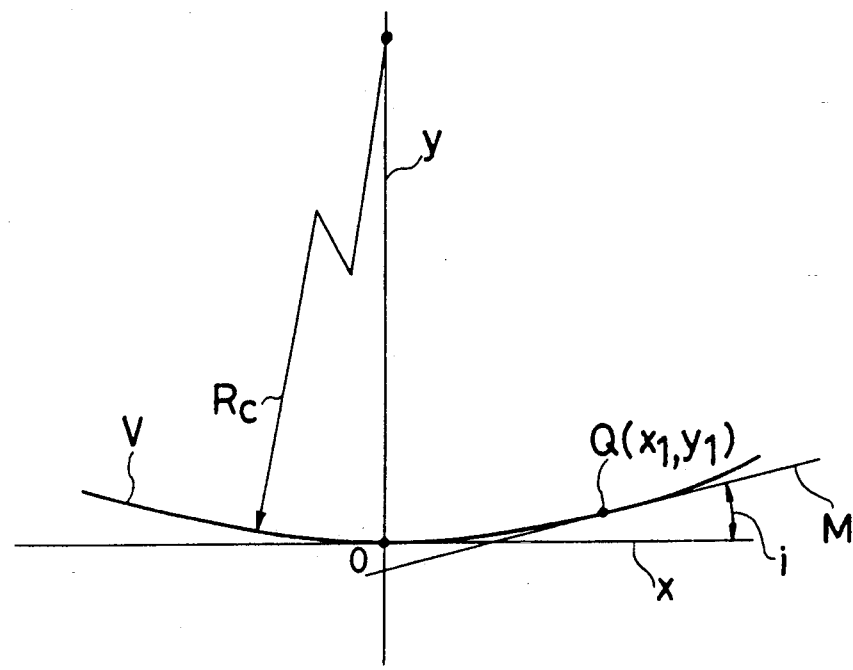
FIG. 3 is a drawing showing a crowning curve provided on the tooth 23e of the smaller gear 23 shown in FIG. 2.

The reason why the radius $R_{12}$ of the crowning of the gear 23 in accordance with the present invention can be made larger than that of the conventional one is described. FIG. 3 shows the crowning curve on the rectangular coordinate. When the ordinate is designated by "y" and the abscissa is designated by "x", the crowning curve is designated by "V", the radius of curvature of the crowning is designated by "$R_c$", an optional point on the curve "V" is designated by $Q(x_1, y_1)$, and the cross point of the ordinate "y" and the abscissa "x" is designated by "0", equation of the curve "V" is shown by the following equation (2) and the differential equation thereof is shown by the equation (3):

$$y = x^2/2(R_c) \qquad (2)$$

on condition that $dy/dx \ll 1$, $$dy/dx = x/R_c \qquad (3).$$

At the optional point $Q(x_1, y_1)$, an incline "i" of a tangential line "M" of the curve "V" against the abscissa "x" is shown by the following equation (4.1):

$$= d(y_1)/dx = x_1/R_c \qquad (4.1).$$

The equation (4.1) is deformed as the following equation (4.2):

$$R_c = x_1/i \qquad (4.2).$$

Figure 11:
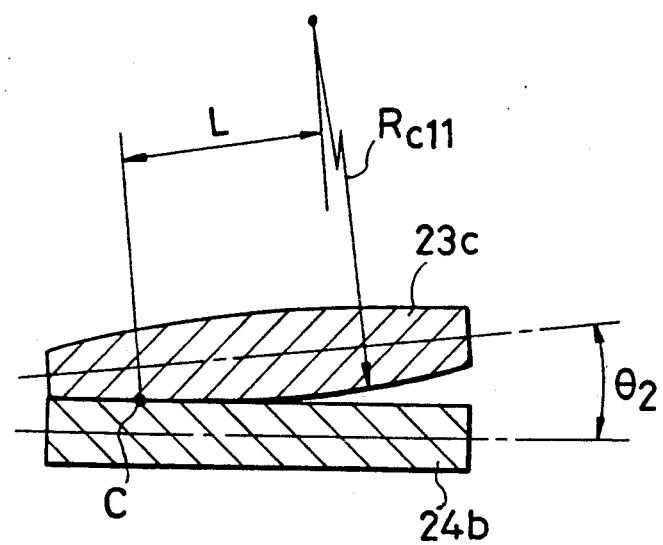
FIG. 11 is the cross-sectional view showing the tooth traces of the smaller gear 23 in the conventional gear drive device wherein the crowning is provided on the tooth trace for preventing the disadvantage of point contact of the smaller and larger gears.
Figure 12:
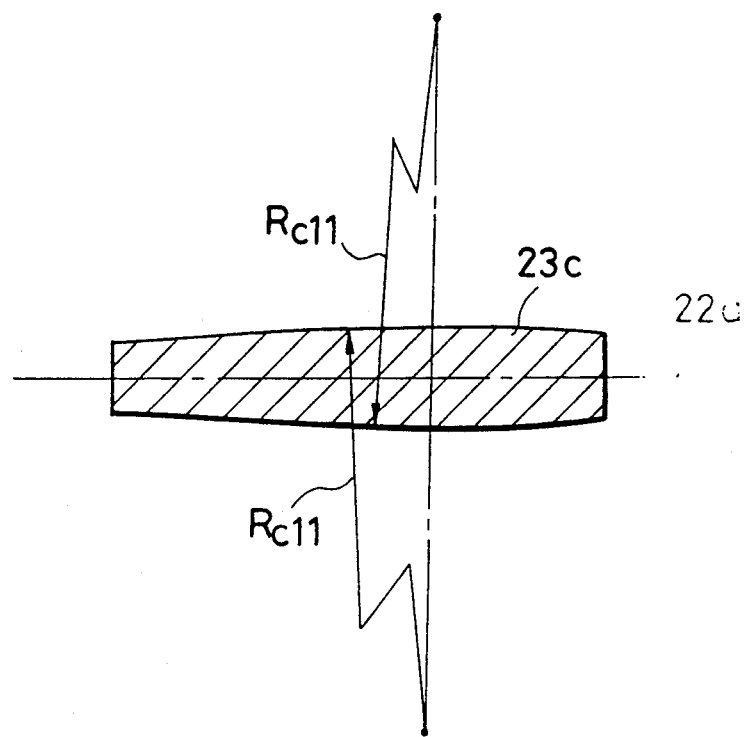
FIG. 12 is the cross-sectional view showing the details of the conventional crowning tooth trace of the smaller gear.
Figure 13:
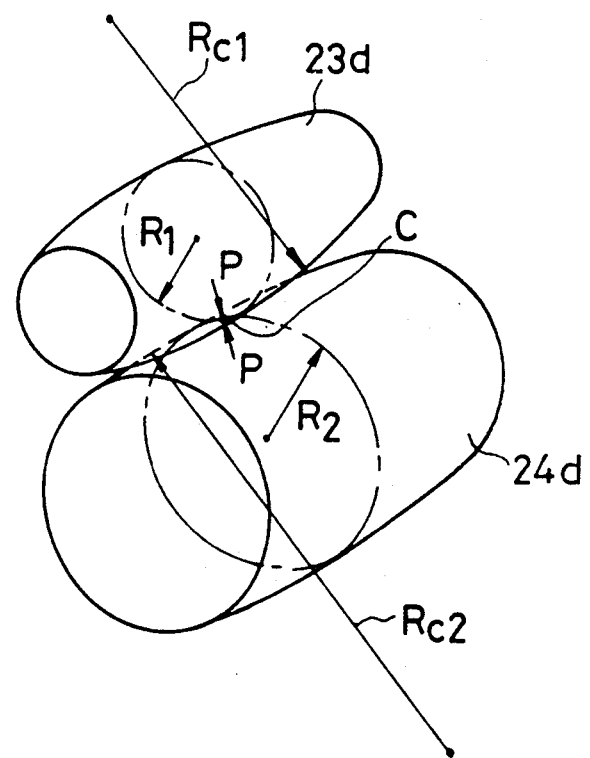
FIG. 13 is the perspective view showing the contact of the large and small barrel-shaped bodies.

For applying the above-mentioned relations to the conventional crowning curve of the smaller gear 23 shown in FIGS. 11 and 12, the radius "$R_c$" can be replaced to "$R_{c11}$" and "$x_1$" can be replaced by a distance "L" between the center of the radius "$R_{c11}$" and the contacting point "C". The above-mentioned equation (4.2) deformed by replacing these symbols is designated by the following equation (4.3):

$$R_{c11} = L/\theta_2 \quad (4.3)$$

When L is retained constant, the smaller the angle "$\theta_2$" are made, the larger the radius "$R_{c11}$" becomes. For making the angle "$\theta_2$" smaller, the tooth trace of the smaller gear 23 is to be cut to have an incline "$\alpha$" against the tooth trace of the larger gear 24 as shown in FIGS. 1, 8, 10(A) and 10(B).

Figure 10A:
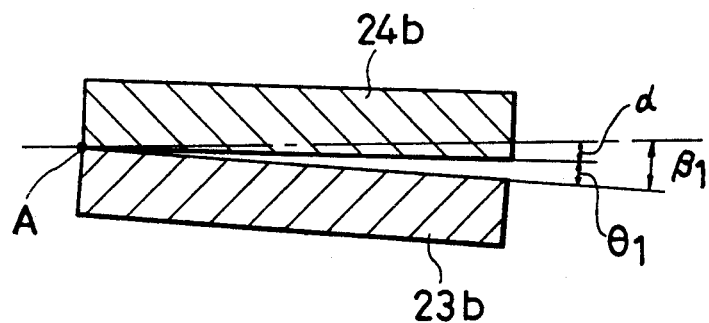
FIG. 10(A) is the cross-sectional view showing the relative inclination between the tooth trace 23b of the smaller gear 23 and the tooth trace 24b of the larger gear 24 when the traction motor 21 rotates in clockwise direction seen from the direction shown by arrow A in FIG. 9(A).
Figure 10B:
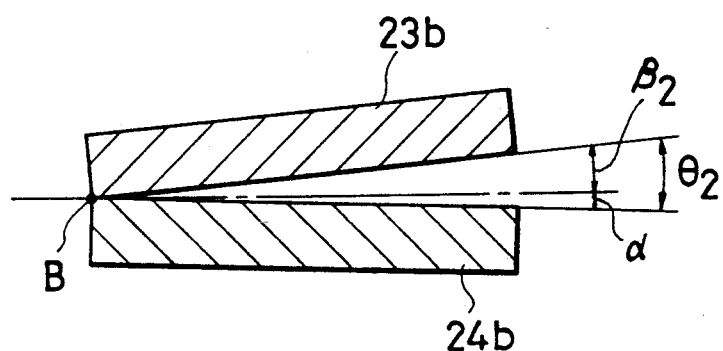
FIG. 10(B) is the cross-sectional view showing the relative inclination between the tooth trace 23b of the smaller gear 23 and the tooth trace 24b of the larger gear when the traction motor 21 rotates in counterclockwise direction seen from the direction shown by arrow A in FIG. 9(A).

In other word, selecting the angle to be the average of the angles $\theta_1$ in FIG. 10(A) and $\theta_2$ in FIG. 10(B), even when the traction motor 21 is rotated either in clockwise direction or counterclockwise direction, the relative inclination angles between the tooth faces of the smaller gear 23 and the larger gear 24 can be made substantially the same.

Generally the traction motor 21 outputs substantially the same power in rotations of clockwise direction and counterclockwise direction. Therefore, the absolute values of the angles $\beta_1$ in FIG. 10(A) and $\beta_2$ in FIG. 10(B) are substantially the same. When such angles are represented by "$\beta$", the maximum inclination angle "$\theta$" between the tooth traces of the smaller gear 23 and the larger gear 24 is equal to the angle "$\beta$".

In this embodiment, the tooth traces of the smaller gear 23 and the larger gear 24, teeth whereof are cut in different manner, are shown in FIG. 1.

The essentials of the present invention is to make the tooth traces of the smaller gear 23 and the larger gear 24 parallel to each other when the smaller gear 23 is engaged with the larger gear 24, so as not to correspond to the inclination angle of the tooth trace of the larger gear 24 which is inclined owing to the deflection of the axle 19 caused by the load of the body 11 and the frame 18 of the bogie 12, under the condition that the gear drive device is in no-load.

For attaining this purpose, other embodiments are proposed.

Figure 14:
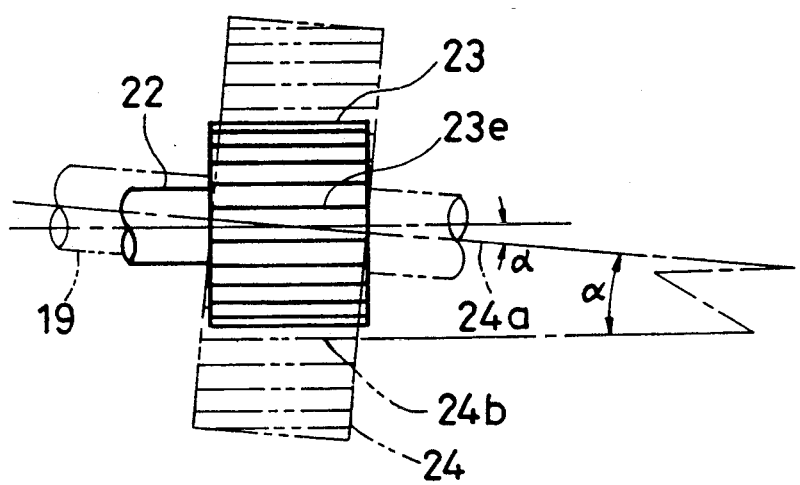
FIG. 14 is a front view showing a second preferred embodiment of an engagement of a smaller and a larger gears of a gear drive device for railway motor car in accordance with the present invention.

As shown in FIG. 14 which shows a second embodiment of the gear drive device for railway motor car in accordance with the present invention, for compensating the inclination angle "$\alpha$" of the tooth trace of the larger gear 24 due to the deflection of the axle 19, the tooth traces of the larger gear 24 are previously twisted by "$\alpha$". Thereby, the tooth traces of the larger gear 24 and the smaller gear 23 are engaged parallel with each other. The crowning is enforced on the teeth of the smaller gear 23.

Figure 15:
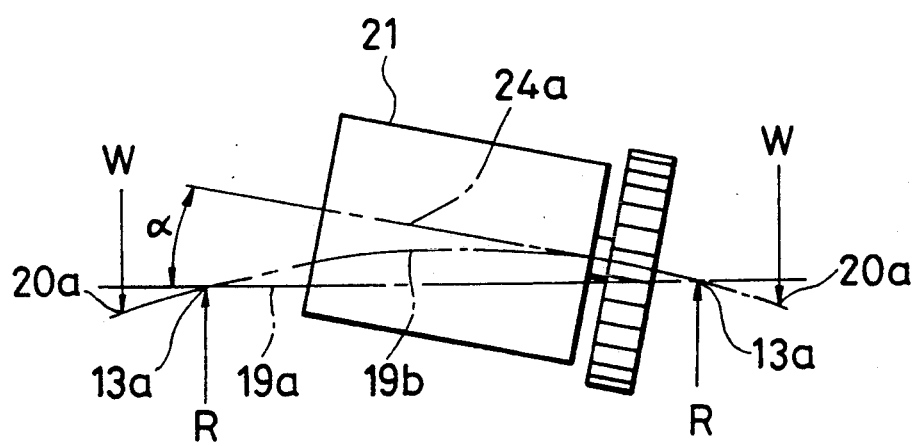
FIG. 15 is a front view showing a third preferred embodiment of suspension of a traction motor with a smaller gear of a gear drive device for railway motor car in accordance with the present invention.

As shown in FIG. 15 which shows a third embodiment of the gear drive device for railway motor car in accordance with the present invention, the traction motor 21 is suspended on the axle 19 and the frame 18 in a manner that the tooth trace of the smaller gear 23 which is fixed on the rotation axis 22 of the traction motor 21 is to be parallel to those of the larger gear 24 which has the inclination angle "$\alpha$" due to the deflection of the axle 19. The crowning is also enforced on the teeth of the smaller gear 23.

Figure 16:
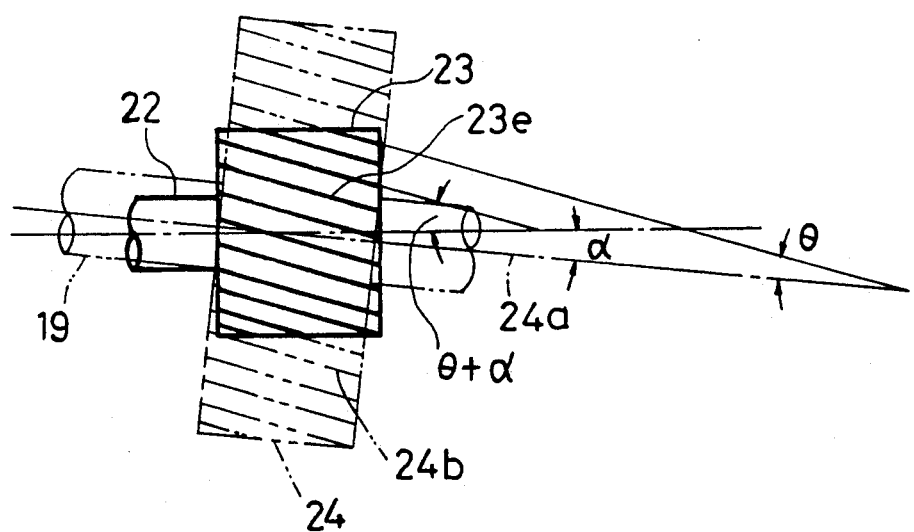
FIG. 16 is a front view showing a fourth preferred embodiment of an engagement of a helical smaller and a helical larger gears of a gear drive device for railway motor car in accordance with the present invention.

In the above-mentioned embodiments, spur gears are used as the smaller gear 23 and the larger gear 24, respectively. Helical gears, however, can be used as the smaller gear 23 and the larger gear 24. As shown in FIG. 16 which shows a preferred fourth embodiment of the gear drive device for railway motor car in accordance with the present invention, the tooth traces 24b of the larger gear 24 is twisted to be helical. When the helical angle of the larger gear 24 is designated by "$\theta$", the helical angle of the smaller gear 23 which is engaged with the larger gear 24 is to be "$\theta+\alpha$". Thereby, the tooth traces 23e of the smaller gear 23 and the tooth traces 24b of the larger gear 24 become parallel to each other when the axle 19 is deflected by the load of the body 11 and so on.

Figure 4:
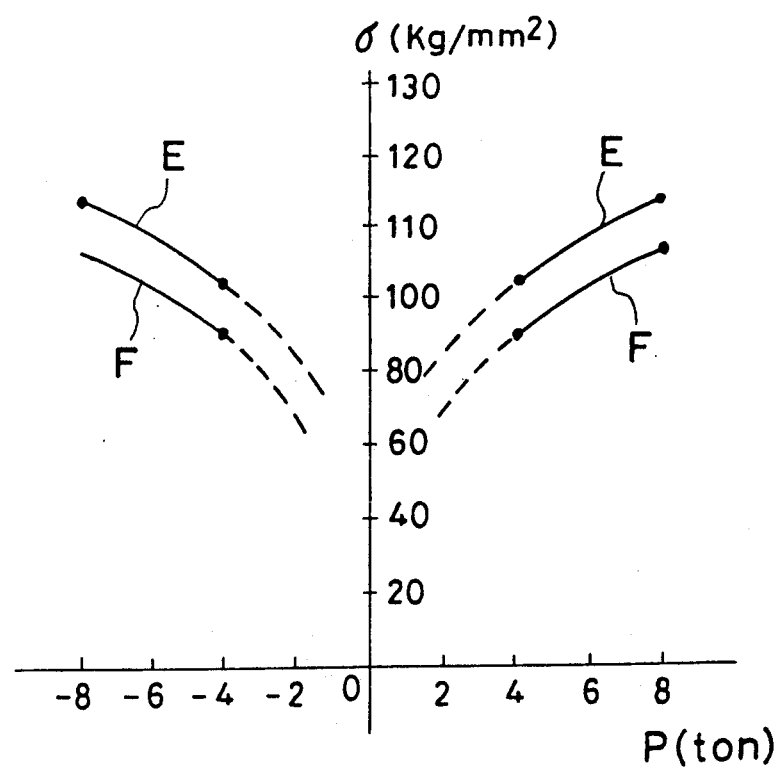
FIG. 4 is a drawing comparatively showing simulated characteristic curves of contact stress on a contacting faces of the gears of the present invention and those of the conventional ones.
Figure 5:
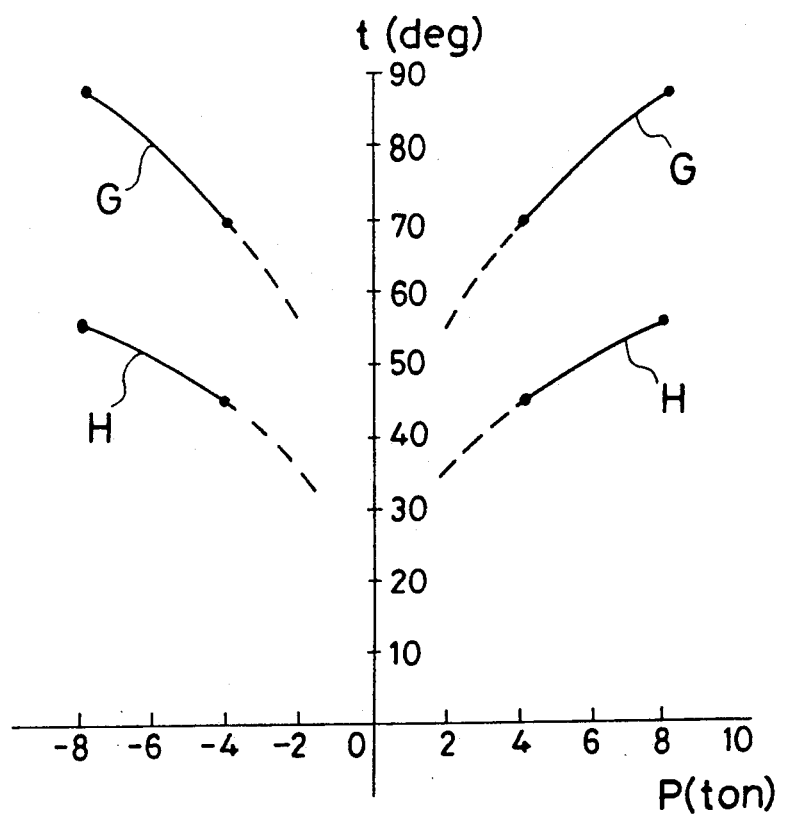
FIG. 5 is a drawing comparatively showing simulated characteristic curves of friction heating temperatures on tooth faces of the gears of the present invention and those of the conventional ones.
Figure 6:
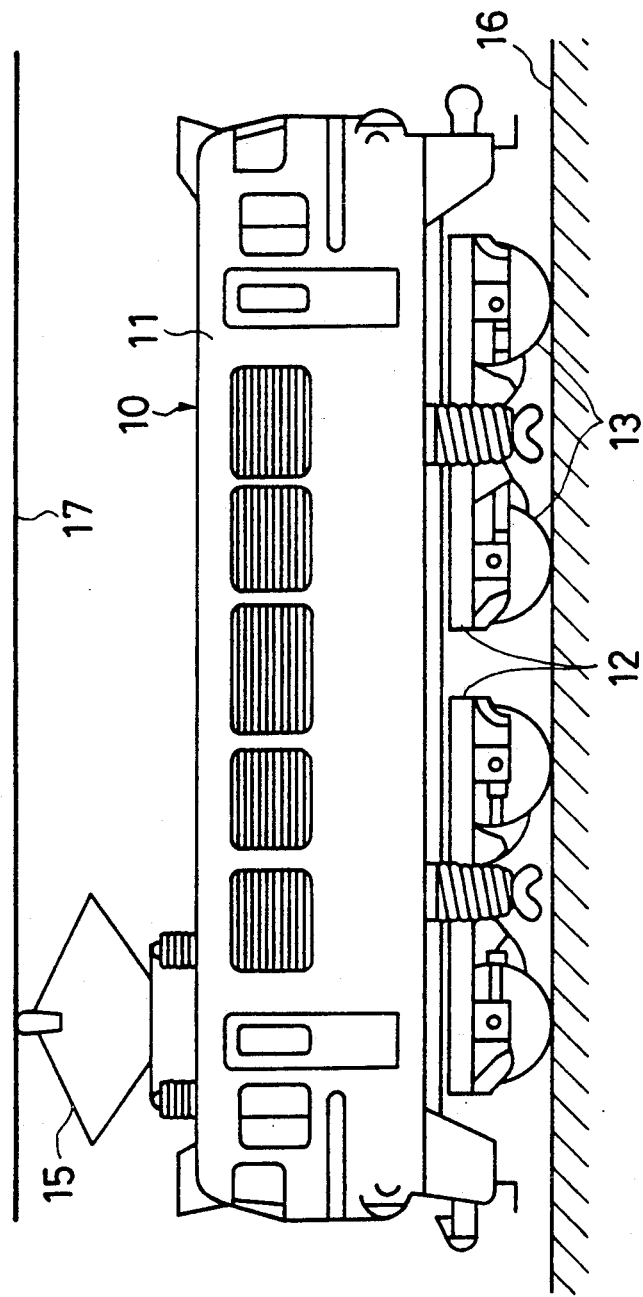
FIG. 6 is the side-view schematically showing the constitution of typical and general electric locomotive.

Simulations of the contact stress and the friction heating temperature on the tooth face of the gears of the first embodiment of the gear drive device, which is applied to the electric locomotive, are shown in FIGS. 4 and 5, respectively.

In FIG. 4, "$\sigma$" designates the contact stress on the tooth face, "P" designate a force acting on the tooth face, characteristic curves "E" show the simulation of the contact stress of the conventional gear drive device and characteristic curves "F" show the simulation of the contact stress of the gear drive device in accordance with the present invention. When the characteristic curves "E" and "F" are compared with each other, it appears that the contact stress in the gear drive device in accordance with the present invention is smaller by about 20% than that in the conventional gear drive device.

In FIG. 5, "t" designates the temperature of the tooth face due to the friction heating, "P" designates the force acting on the tooth face, characteristic curves "G" show the simulation of the temperature of the tooth face in the conventional gear drive device and characteristic curves "H" show the simulation of the temperature of the tooth face of the gear drive device in accordance with the present invention. When the characteristic curves "G" and "H" are compared with each other, it appears that the partial heating temperature on the tooth face due to the sliding friction of the tooth faces in the gear drive device in accordance with the present is smaller by about 40% than that of the conventional gear drive device.

In the above-mentioned embodiments, the crowning is enforced on the tooth of the smaller gear 23. It, however, is possible to enforce the crowning on the tooth of the larger gear 24 instead of the smaller gear 23.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is

1. In a gear drive device for railway motor car comprising:
   a larger gear fixed on an axle which is rotatively held on a frame of a bogie;
   a traction motor suspended on said axle and said frame;
   a smaller gear which is fixed on a rotation shaft of said traction motor and engaging with said larger gear; wherein tooth trace of one of said smaller gear and said larger gear is twisted for said engagement with tooth trace of the other in a manner that teeth of both of said larger gear and said smaller gear engaging thereto corresponding to an inclination of a center axis of said larger gear due to deflection of said axle by receiving a load of said railway motor car; and tooth traces of one of said smaller gear and said larger gear has crowning.

2. In a gear drive device for railway motor car comprising:

a larger gear fixed on an axle which is rotatively held on a frame of a bogie;

a traction motor suspended on said axle and said frame;

a smaller gear which is fixed on a rotation shaft of said traction motor and engaging with said larger gear; wherein said traction motor is suspended in a manner that tooth trace of said smaller gear is parallel to that of said larger gear which is inclined due to deflection of said axle by receiving a load of said railway motor car; and tooth traces of one of said smaller gear and said larger gear has crowning.

3. In a gear drive device for railway motor car in accordance with claim 1 or 2, wherein said smaller gear and said larger gear are spur gears, respectively.

4. In a gear drive device for railway motor car in accordance with claim 1 or 2, wherein said smaller gear and said larger gear are helical gears, respectively.

5. In a gear drive device for railway motor car in accordance with claim 1, wherein said smaller gear and said larger gear are helical gears, respectively; and helical angle of said smaller gear is larger about an angle corresponding to said inclination of said center axis of said larger gear than that of said larger gear.

* * * * *